(12) United States Patent
Zuccarino et al.

(10) Patent No.: US 9,294,537 B1
(45) Date of Patent: Mar. 22, 2016

(54) SUGGESTING A TAG FOR CONTENT

(71) Applicants: Scott Zuccarino, San Francisco, CA (US); Samuel Shoji Goto, Mountain View, CA (US); Christopher Reaves Messina, San Francisco, CA (US); Richard Gingras, Los Altos, CA (US); Lucian F. Cionca, Santa Clara, CA (US); Andre Rohe, Mountain View, CA (US); Hao Wang, Santa Clara, CA (US)

(72) Inventors: Scott Zuccarino, San Francisco, CA (US); Samuel Shoji Goto, Mountain View, CA (US); Christopher Reaves Messina, San Francisco, CA (US); Richard Gingras, Los Altos, CA (US); Lucian F. Cionca, Santa Clara, CA (US); Andre Rohe, Mountain View, CA (US); Hao Wang, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 339 days.

(21) Appl. No.: 13/738,101

(22) Filed: Jan. 10, 2013

Related U.S. Application Data

(60) Provisional application No. 61/586,526, filed on Jan. 13, 2012, provisional application No. 61/586,390, filed on Jan. 13, 2012.

(51) Int. Cl.
*G06F 15/16* (2006.01)
*H04L 29/08* (2006.01)
*G06Q 50/00* (2012.01)

(52) U.S. Cl.
CPC .............. *H04L 67/02* (2013.01); *G06Q 50/01* (2013.01)

(58) Field of Classification Search
CPC ............................... G06Q 50/01; H04L 67/02
See application file for complete search history.

(56) References Cited

U.S. PATENT DOCUMENTS

| | | | |
|---|---|---|---|
| 7,739,304 B2 | 6/2010 | Naaman | |
| 7,844,668 B2 | 11/2010 | Canning et al. | |
| 8,549,013 B1 | 10/2013 | Sarma et al. | |
| 8,676,875 B1 | 3/2014 | Smith | |
| 8,676,913 B1 | 3/2014 | Roche et al. | |
| 8,683,355 B1 | 3/2014 | Gailloux et al. | |
| 8,793,285 B2 * | 7/2014 | Han | 707/803 |
| 2008/0140699 A1 | 6/2008 | Jones et al. | |
| 2009/0222551 A1 | 9/2009 | Neely et al. | |
| 2010/0228777 A1 | 9/2010 | Imig et al. | |
| 2011/0029533 A1 | 2/2011 | Jayakody | |
| 2011/0314014 A1 * | 12/2011 | Junginger et al. | 707/736 |
| 2012/0064499 A1 | 3/2012 | Samuelson et al. | |
| 2012/0203832 A1 | 8/2012 | Vastardis et al. | |
| 2013/0055101 A1 * | 2/2013 | Sabur | 715/739 |
| 2013/0073547 A1 * | 3/2013 | Pereyra-Rozas | 707/736 |
| 2013/0073686 A1 * | 3/2013 | Sandholm | 709/219 |
| 2013/0110827 A1 * | 5/2013 | Nabar et al. | 707/728 |
| 2013/0262588 A1 * | 10/2013 | Barak et al. | 709/204 |
| 2014/0040029 A1 * | 2/2014 | Vhora | 705/14.54 |
| 2014/0040370 A1 | 2/2014 | Buhr | |
| 2014/0181197 A1 * | 6/2014 | Baggott | 709/204 |
| 2015/0046418 A1 * | 2/2015 | Akbacak et al. | 707/706 |

OTHER PUBLICATIONS

Office Action issued in U.S. Appl. No. 13/604,857 on Sep. 25, 2014, 18 pages.

Office Action issued in U.S. Appl. No. 13/604,857 on Sep. 24, 2015, 12 pages.

\* cited by examiner

*Primary Examiner* — Mohamed Wasel
(74) *Attorney, Agent, or Firm* — Fish & Richardson P.C.

(57) ABSTRACT

Techniques for suggesting a tag for content may include the following: receiving, from a member of a social network, an entry in a display field along with an indication that the entry is for a post; after receiving the entry and the indication, identifying content by performing a search using at least some of the entry and information about the member of the social network; obtaining tags corresponding to the identified content; ranking the tags; outputting the ranked tags as suggestions to include with the display field; and augmenting the entry by adding a selected tag to the display field.

16 Claims, 7 Drawing Sheets

Search  Mail  Social.Network  Videos  Books  More...                                       Search Jane McDavies                                                  211
view profile                  Share what's new ....

Stream                    [📷] [🎞] [👤] [💡]                                                Post
Incoming                                                                          230
                              210
News                          Frank Blank – Yesterday 8:11 PM
                              How about those Red Sox, eh?       209
Videos
                              Jörge Börge – Yesterday 8:19 PM
Circles                       I originally shared this post.
Gadgets & Games               Andrew Eames – Yesterday 9:04 PM
                              Terrible call on that ball.                  207
Questions
                              Danny Cheung – Today 10:17 AM
Music                         Who do they play next?

Photos                        Eric Carlson – Today 11:26 AM
                              Rain delay....
                                                              222
                              Robert James – Today 12:30 PM
                              Red Sox Nation! #RedSoxNation
                                                         223
                              Felix Jones – Today 12:38 PM
                              They're up 3 – nothing! #RedSox
                                                            224
                              Carlos Rao – Today 12:45 PM
                              Oh boy, extra innings! Go Red Sox! #BoSox
                                                                   220
                              Sally Hess NYC – Today 1:04 PM
                              Who is pitching tonight for the Red Sox?
                                                                    225
                              Danny Swan – Today 1:17 PM
                              I am wearing my Red Sox ;) #RedSox Allen Tanner – Today 1:38 PM
                              Watching the game at the pub later.

Greg Milhouse – Today 2:45 PM
                              Foul ball!

SUGGESTING A TAG FOR CONTENT

CROSS-REFERENCE TO RELATED APPLICATIONS

Priority is hereby claimed to U.S. Provisional Application No. 61/586,526, which was filed on Jan. 13, 2012. The contents of U.S. Provisional Application No. 61/586,526 are hereby incorporated by reference into this disclosure. Priority is also hereby claimed to U.S. Provisional Application No. 61/586,390, which was filed on Jan. 13, 2012. The contents of U.S. Provisional Application No. 61/586,390 are hereby incorporated by reference into this disclosure.

BACKGROUND

This disclosure relates generally to suggesting a tag for content.

Social networks permit users to post information about themselves and to communicate with other people, e.g., their friends, family, and co-workers. Some social networks permit users to specify friendships with other users.

Additionally, some social networks allow users to access, and post, content relating to discussion topics. Such content may be posted to a discussion forum, to a Web page, or to another place that is accessible to those on the social network. Discussion topics may be created by members of the social network, and made accessible through their profiles, posts, home pages, or the like. In some social networks, a discussion topic can be identified by a marker (e.g., a hash mark) followed by a discussion title. The title is typically indicative of the subject of the discussion topic. The marker and title form a tag this is a link to a Web page, forum, or other place where information about the discussion topic may be exchanged.

A social network may include numerous (e.g., tens, hundreds, or more) discussion topics that relate to the same subject, but that have different tags. For instance, if the Boston Red Sox are playing in the World Series, there could be multiple, similar conversations around different tags.

SUMMARY

Techniques for suggesting a tag for content may include the following: receiving, from a member of a social network, an entry in a display field along with an indication that the entry is for a post; after receiving the entry and the indication, identifying content by performing a search using at least some of the entry and information about the member of the social network; obtaining tags corresponding to the identified content; ranking the tags; outputting the ranked tags as suggestions to include with the display field; and augmenting the entry by adding a selected tag to the display field. The foregoing techniques may include one or more of the foregoing features, either alone or in combination.

The selected tag may categorize the entry by associating the entry with a discussion topic corresponding to the selected tag. Performing the search may include identifying one or more items associated with the entry based, at least in part, on the information about the member. The one or more items each may have one or more corresponding tags. Identifying the content may include determining relevance scores for the one or more items.

The information about the member may include one or more of the following: social connections of the member to others on and/or off of the social network, a geographic location of the member, a geographic proximity of the member to other members of the social network, a language of the member, content entries received from the member over a course of time, tags of discussion topics that the member has selected over a course of time, subject matter of content that the member has accessed over a course of time, and a profile of the member.

Identifying the content may include determining, for at least some of the content, a probability that the entry corresponds to the content The tags may be ranked in accordance with respective probabilities of the corresponding content and also based on the information associated with the member. The selected tags may be output in order of rank The tags may be obtained based also on a frequency of appearance of the tags on the social network, and/or on times corresponding to when the tags were created on the social network.

Advantages of the foregoing techniques may include providing members of a social network with suggestions for tags that may be of interest based, e.g., on their social connections. The techniques also make such suggestions without requiring the user to enter characters for the tag. As a result, the techniques make it easier to associate input posts with appropriate tags.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

FIG. 2 shows an example of a main page for a user of a social network.

FIG. 7 is an example of a Web page containing suggested tags for the input content of FIG. 6.

Like reference symbols in the various drawings indicate like elements.

DETAILED DESCRIPTION

Described herein are systems for suggesting a tag for an input content entry. Such a system may include receiving, from a member of the social network, a content entry in a display field. The content entry may include text and/or other content including, for example, images, video, or other information that may be part of a post, a comment, a blog, or the like. In this example, however, the content entry does not include a marker or other indicia identifying a tag.

In this example, the system conducts a search based on, e.g., key words in the content entry and information associated with the member. For example, the search may identify content that contains the key words and to which the member has some social connection (e.g., the content may be by an author to whom the member is socially connected). The system may determine relevance scores for items of content that it identifies in the search. A relevance score is a measure of how closely the corresponding content matches the input query. In this example, the query includes the key words from the content and the information about the member. Tags for content items that are deemed most relevant to the query may be selected for output to the member as tag suggestions. The selected tags may be ranked prior to output. Ranking may be performed based, e.g., on information that is member-specific and/or information that is not member-specific. For example, tags for content to which the member has a social connection may be ranked as having more relevance than tags for content to which the member does not have a social connection. In another example, tags may be ranked based on their system-wide popularity regardless of whether the member has a social connection to the author of the corresponding content.

The ranked tags are output to the member's computer for selection. The member may select one of the tags. The selected tag is then associated with the content entry, and thereafter appears in association with that content entry.

The techniques described above may be implemented in an appropriate network environment, with appropriate devices and computing equipment. An example of such an environment is described below.

Figure 1:
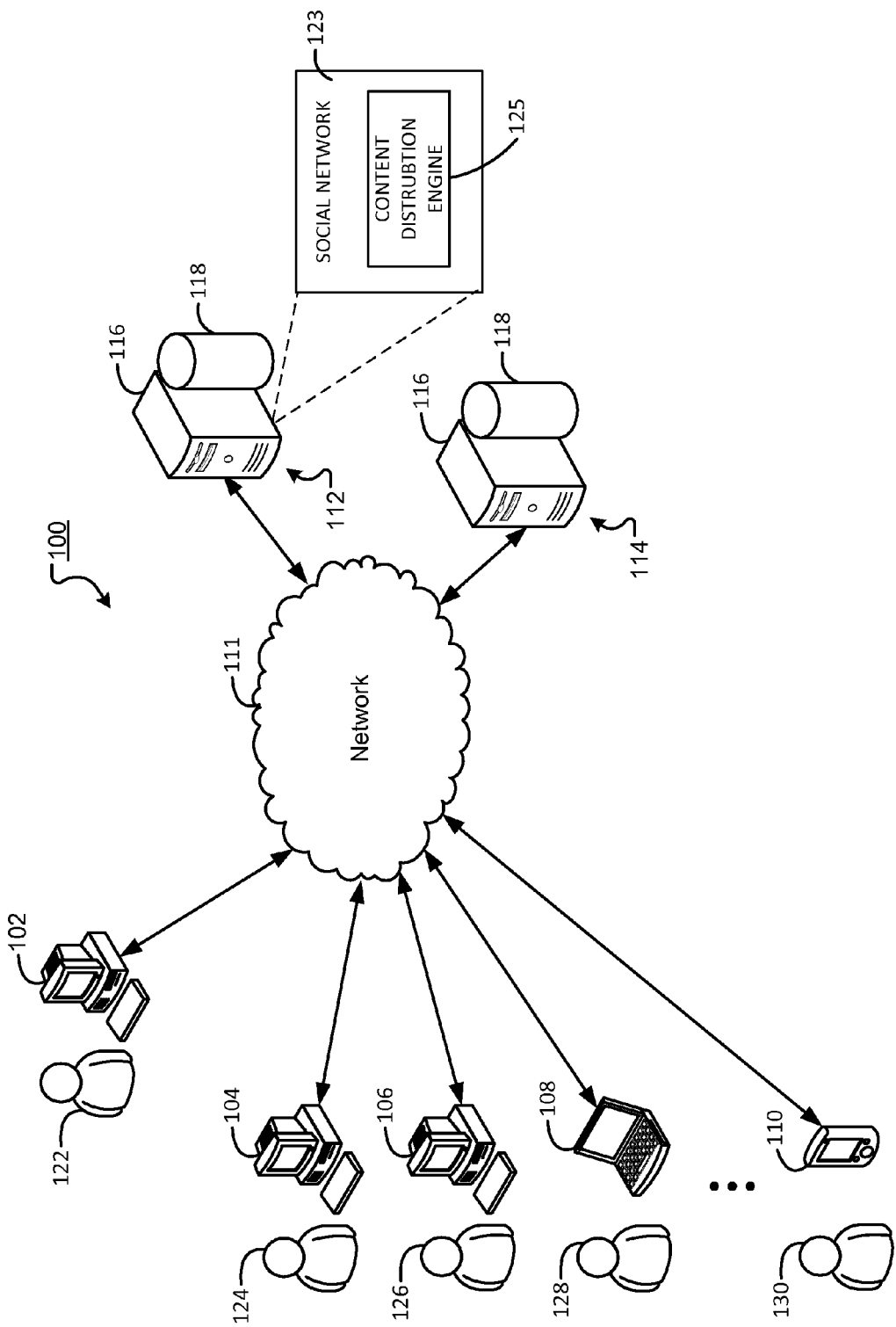
FIG. 1 is a block diagram showing an example of network environment on which the process described herein may be implemented.

FIG. 1 is a block diagram showing an example of a network environment 100 on which the techniques described herein may be implemented. Network environment 100 includes computing devices 102, 104, 106, 108, 110 that are configured to communicate with a first server system 112 and/or a second server system 114 over a network 111. Computing devices 102, 104, 106, 108, 110 have respective users 122, 124, 126, 128, 130 associated therewith. The first and second server systems 112, 114 each includes a computing device 116 and a machine-readable repository, or database 118. Example environment 100 may include many thousands of Web sites, computing devices and servers, which are not shown.

Network 111 may include a large computer network, examples of which include a local area network (LAN), wide area network (WAN), the Internet, a cellular network, or a combination thereof connecting a number of mobile computing devices, fixed computing devices, and server systems. The network(s) included in network 111 may provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, or other such transceiver system.

Computing devices 102, 104, 106, 108, 110 enable respective users 122, 124, 126, 128, 130 to access and to view documents, e.g., Web pages included in Web sites. For example, user 122 of computing device 102 may view a Web page using a Web browser. The Web page may be provided to computing device 102 by server system 112, server system 114 or another server system (not shown).

In example environment 100, computing devices 102, 104, 106 are illustrated as desktop-type computing devices, computing device 108 is illustrated as a laptop-type computing device 108, and computing device 110 is illustrated as a mobile computing device. It is noted, however, that computing devices 102, 104, 106, 108, 110 may include, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some implementations, a computing device may be included as part of a motor vehicle (e.g., an automobile, an emergency vehicle (e.g., fire truck, ambulance), a bus).

Users interacting with computing devices 102, 104, 106, 108, 110 can participate in a social network 123 hosted, e.g., by the server system 112, by uploading and downloading electronic content to the social network. The electronic content may include, e.g., text comments (e.g., updates, announcements, replies), digital images, videos, audio files, and/or other appropriate information. In some implementations, information can be posted on a user's behalf by systems and/or services external to social network 123 or to server system 112. For example, the user may post a review of a movie to a movie review Web site, and with proper permissions, that Web site may cross-post that review to social network 123 on the user's behalf. The user may include, with a post, a tag, which includes a hyperlink to a discussion forum about a particular topic (e.g., the movie). The tag typically relates to the topic of the post (although that need not be the case always). The discussion forum contains posts by the user and others who have included similar tags on their posts.

Generally, users interacting with the computing devices 102, 104, 106, 108, 110 can also use social network 123 to define social circles to organize and to categorize the user's relationships to other users of the social network. The social circles become part of the user's social connections. Electronic content can be distributed to contacts within social network 123, including one or more social circles, so that such content is viewable by the indicated contacts and/or contacts, or others. In an example operation, a user of social network 123 can generate content and indicate, e.g., one or more individual social network contacts and/or social circles to which the generated content is to be distributed. During a content write-time, a content data set is transmitted from the user's client computing device (e.g., computing device 102 of FIG. 1) to a distribution hub (e.g., a content distribution engine 125), which can be provided at a server (e.g., server system 112 of FIG. 1 or elsewhere on the network). In some implementations, the content data set may include content data (e.g., text, identity of the content author, tag, uniform resource indicator (URI), timestamp data (e.g., a timestamp indicating the time that the content was generated)), distribution data (e.g., data identifying contacts and/or one or more social circles), and identification (ID) data (e.g., an ID assigned to the content data set upon generation of the content).

In some implementations, other data can be appended to content data sets. Example other data can include scoring data. In some examples, scoring data can include a social affinity score among other possible scoring data. As described in more detail below, affinity identifies the closeness of parties on a social graph.

The scoring data may be recipient specific. For example, the scoring data can include social affinity data that is provided based on respective social affinity scores between an author of the content and each recipient of the content. For example, a first user can author content and define a distribution of the content, thereby creating an underlying content data set. The distribution can include a second user and a third user, and so forth. A first social affinity score associated with a social relationship between the first user and the second user can be provided, and a second social affinity score associated with a social relationship between the first user and the third user can be provided. The first social affinity score can be different from the second social affinity score, reflecting different social relationships between the first user and the second user and the first user and the third use. The first social affinity score and the second social affinity score can be appended to the content data set and/or stored in another location while maintaining an association with the content data set.

In some implementations, the distribution data is processed to provide an access control list (ACL) that specifies which contacts within the social network are granted access to the content. In some implementations, content-associated social affinity scores can be processed to provide the ACL. For example, distribution data can indicate that content is to be accessible by, and/or distributed to, a particular user. A social affinity score can be determined for the content and can be specific to a relationship between the content recipient and the author of the content. In some examples, if the social affinity score is below a threshold score, it is determined that the content will not be accessible by, and/or distributed to, the particular user. Consequently, in this example, although the particular user may receive distribution of the content by the author, the particular user is not provided in the ACL for the content. In some examples, if the social affinity score is at or above the threshold score, it is determined that the content will be accessible by, and/or distributed to, the particular user. Consequently, the particular user may receive distribution of the content by the author and the particular user is provided in the ACL for the content.

Generally, the distribution hub determines end points to which the content data set is to be distributed based, e.g., on the ACL. For example, the set of contacts that may care about the content and/or that are allowed access to the content is determined based on the ACL, and the ID of the content is written to a per user/view index at the distribution hub. When fetching content to distribute to a user, the user/view index is accessed and the IDs of the various contents that the user is allowed to view are determined. The content data sets are retrieved from a data store (e.g., data store 118 of FIG. 1) and are transmitted to a client device associated with the requesting user. In some implementations, the ACL can be provided based on an overall score, a quality score and/or the social affinity score. Content may be distributed to a user's main page for inclusion in a content stream.

FIG. 2 shows an example main page 200 for a member of a social network. For example, page 200 can be provided as a Web page within a Web site of social network 123, and can display electronic content that has been shared with a member 201 associated with the page 200. In the illustrated example, the member is "Jane McDavies" and page 200 displays, items (e.g., electronic content) that other members have shared with the member and/or items that the member has shared with other members. As shown in the figure, this content includes various tags 222, 223, 224, 225. Page 201 also includes a social network menu 206 and a content stream 207, in which items of content are presented. Example content items 209 that have been distributed to the member are displayed in the content stream. Generally, items 209 displayed in content stream 207 include electronic content that is distributed to the member from contacts established within the social network. A content sharing interface 210 can also be provided on page 200. The member can activate (e.g., click on) the interface 210 to input electronic content. Although twelve content items are depicted in FIG. 2, it is appreciated that page 200 can display more or less than twelve content items to the member. A search field 211 can also be provided on page 200 to search social network 123 for content.

In the above example, a member may make a post, either in their own content stream or elsewhere. The member may associate a tag with the post. In this example, a hash (#) mark is used to identify the tag, although other types of marks may be used to identify the tag. The techniques described herein may be used to suggest tags for text or other content entered into interface 210

Figure 3:
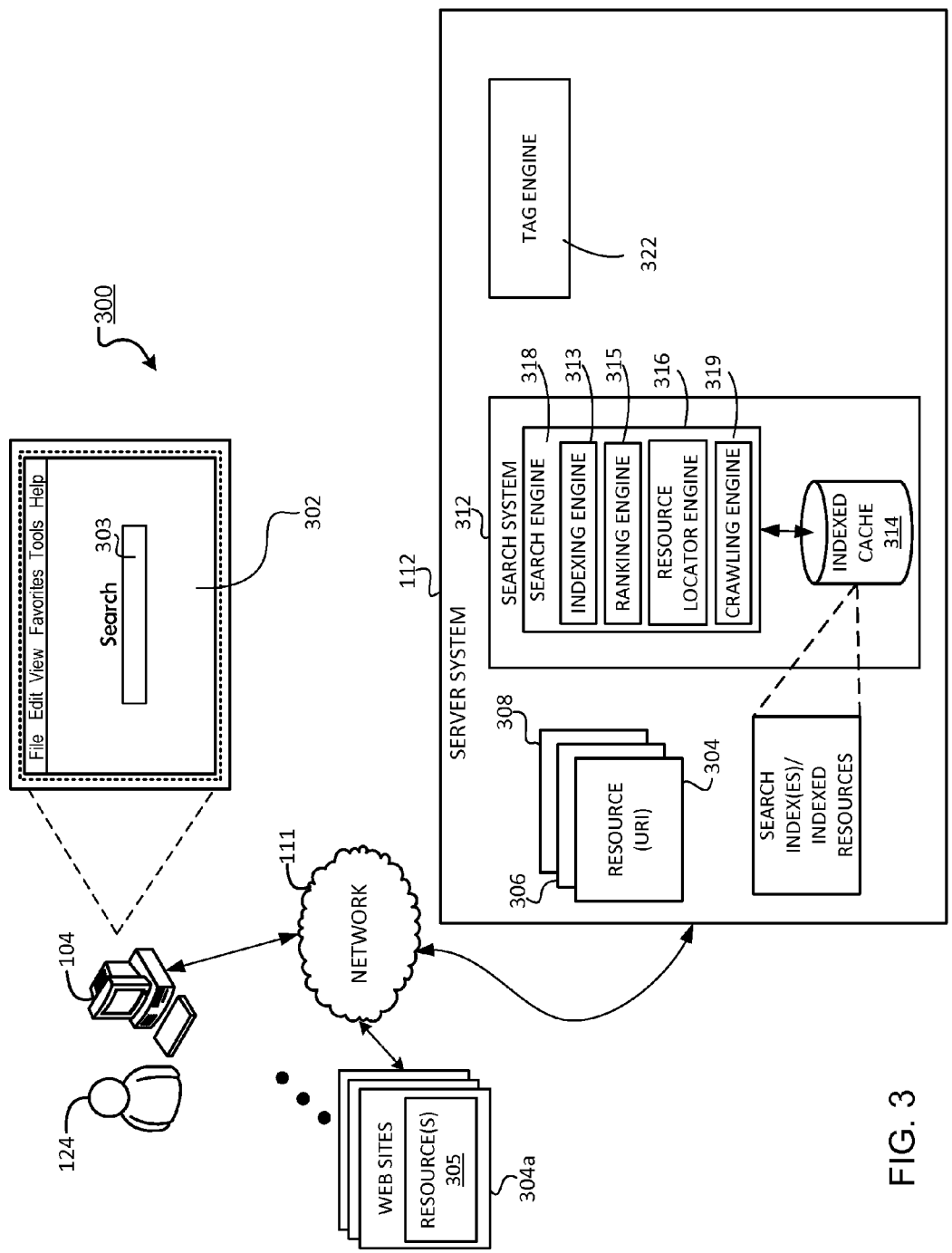
FIG. 3 is a block diagram of an example of part of the network environment of FIG. 1.

FIG. 3 is a block diagram of an example part of the network environment of FIG. 1. Specifically, FIG. 3 shows portion 300 of example network environment 100. In this example implementation, server system 112 stores resources 304, 306, 308. A resource has an associated resource identifier (Resource ID). For example, resources 304, 306, 308 may correspond to different Web pages of the same Web site, or may correspond to Web pages of different Web sites. As explained below, in this example operation, computing device 104 communicates with server system 112 to display a home Web page ("home page") 302 of a search engine Web site and a home page of a social network (e.g., page 200 of FIG. 2 containing the user's content stream).

To view a Web page, user 124 may input or select a Resource ID using a Web browser that is executed on computing device 104. The Resource ID may include, for example, a URI or a uniform resource locator (URL). A request including the Resource ID is transmitted from computing device 104 to server system 112 over network 111. In response, the server system identifies the requested resource based on the Resource ID, and transmits the requested resource to computing device 104 over network 111. For example, the resource may be home page 200 of social network 123 or a home page 302 of search system 312. In some implementations, search system 312 is part of social network 123 or it is independent thereof yet able to access content from social network 123.

Page 302 for search system 312 may include a field 303 for inputting a search query that is transmitted to the search system. The search query may include, e.g., one or more terms, images, audio, video, or other content. In response, the search system performs a search of an indexed cache containing one or more search indexes, and returns a search results list to a user. The search results list may include, e.g., links to content that is deemed relevant to the search terms. Search system 312 may be implemented, e.g., on server system 112 as shown or on other appropriate hardware. Search system 312 includes a search engine 318 and one or more search indexes. Search system 312 identifies resources 305 (e.g., Web pages, images, news articles, user-generated content, social information (e.g., from social network 123), or other public and/or private resources) provided by content publishers on Web sites 304a. Appropriate permission(s) may be required to access non-public content.

Search system 312 includes a crawling engine 319 to crawl resources, and an indexing engine 313 to index those resources in one or more search indexes (referred to collectively as "search index") stored, e.g., in indexed cache 314. Search engine 318 also includes a resource locator engine 316 for identifying resources within the search index that are responsive to, and that may be relevant to, a query (for example, by implementing a query text matching routine). A ranking engine 315 ranks resources deemed relevant to the search query.

Social graph information may be included in a same search index as other resources or in a separate search index (not shown). As described in more detail below, the social graph information may include, e.g., comments, endorsements, connections, affinities, and so forth related to indexed content and to a user's social graph. The social graph information may include content from social network 123. A separate search may be performed for general search results responsive to a query, as well as particular search results, that identify resources associated with the user's social graph (e.g., endorsed Web content).

In some implementations, information associated with the user's social graph may be indexed by generating and incorporating suitable data structures, e.g., social restricts, into an existing search index. In some examples, the indexing engine may generate social restricts by mapping identified information to corresponding Web resources referenced in a search index and determining the social connection between the Web resources and the user. For example, the system may access a relationship lookup table that includes relationship data describing a user's social graph to determine such social connections. In some examples, social restricts may be provided in the form of an information tag or other data associated with a referenced Web resource included in the search index.

User-generated content (e.g., social network content) may be included in a same index as other resources or in a separate index, as noted above. In this regard, with appropriate permission, crawling engine 319 may crawl user-generated content (of both the searcher and others, e.g., members of the searcher's social graph), and indexing engine 313 may incorporate that content into an appropriate search index. Resource locator engine 316 may identify that user-generated content based, e.g., on a relevance score of the user-generated content to a search query and based, e.g., on other information, including, e.g., the social connection of the searcher to the content itself or to an author of the content. In this regard, the existence or non-existence of a social connection to the content or author may affect the relevance score. In this context, an author is not limited to one who created the content, but may include, e.g., anyone who interacted with the content, shared the content, endorsed the content, posted the content, and so forth.

In response to a search query, search engine 318 may access indexed cache 314 to identify resources 305 that are relevant to the search query. Resource locator engine 316 may identify resources 305 in the form of search results and return the search results to a requesting device in search results pages. A search result may include data generated by search system 312 that identifies a resource 305, and that includes a link to the corresponding resource, along with images, video, or other appropriate content. An example search result may include a Web page title, a snippet of text or a portion of an image obtained from the Web page, and the URL of the Web page. In some cases, the search results may also include social information. For example, included with some of the search results may be comments, endorsements, or other information obtained about the search results from a user's social graph. The search results may also include user-generated content displayed alone or in association with relevant social information (e.g., a link to a content author's profile). Search results may be displayed in a user's content stream along with other content. For example, a user may conduct a search of the social network from their main page, and the results may be displayed in their content stream along with others' posts.

As noted above, a social graph is a way to represent, graphically, social connections between two parties that may, or may not, be on the same social network, and to represent connections between parties and content. A party may be an individual or an entity, e.g., a company, organization, country, or the like. Types of connections in social graphs may include, but are not limited to, other users to which a user is in direct contact (e.g., user messaging or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph may include connections within a single network or across multiple networks.

Distinct social graphs may be generated for different types of connections. For example, a user may be connected with chat contacts in one social graph, electronic message contacts in a second social graph, and connections from a particular social network in a third social graph. A social graph may include edges to additional parties at greater degrees of separation from the user. For example, an electronic message contact may have its own electronic message contacts to others adding a degree of separation from the user (e.g., user→electronic message contact→contact of electronic message contact). These contacts may, in turn, may have additional contacts at another degree of separation from the user. Similarly, a party's connection to someone in a particular social network may be used to identify additional connections based on that person's connections. Distinct social graphs may include edges connecting one or more social graph to one or more other social graphs. Thus, a social graph may include a single social graph or multiple interconnected social graphs.

As noted, users may designate content as endorsed, share or comment on content, quote URLs, or otherwise indicate an interest or liking of content, examples of which include, but are not limited to, a particular resource, Web page, or search result. For example, an application, widget, or scripting may be provided in search results pages, Web pages, or within a browser application that allows a user to indicate liking, sharing, or other evaluation of an associated resource or search result. The user may mark the particular resource, Web site, or search results to indicate endorsement or other evaluation (e.g., through a browser control or user interface element presented with the associated content). Such relationships to information from others may be captured in a user's social graph.

Affinity between entities of a social graph may be represented by the above-noted edges in the user' social graph. As noted, affinity may identify the closeness of a party to a user. For example, a contact of a contact who has five common middle contacts with the user has more of an affinity with the user (e.g., is considered closer to the user) than a contact of a contact who has only one common middle contact. Factors in determining affinity may include, e.g.: how a contact is connected to the user (e.g., a source of a connection), which social networking site the contact is a member of, whether contact or contact of contact, and how many paths to get to the contact of a contact (e.g., common middle contacts). Edges may be weighted, either in a database containing the social graph or elsewhere, to reflect a level of affinity between connections (e.g., parties) in the social graph.

Affinity between parties may be content specific in some cases. For example, social graph data may identify specific types of content associated with an edge between parties and specific affinities for that content. In an example, the social graph data may specify that, between two connected parties, the first party has a first level of affinity for the second party's videos and a second, different level of affinity for the second party's written work. Similarly, the social graph may specify that the second party has a third, different level of affinity for the first party's blogs. The same is true for content subject matter. For example, the social graph data may specify that, between two connected parties, the first party has a first level of affinity for the second party's content about baseball and a second, different level of affinity for the second party's content about basketball.

Affinity may also be based on the user's interactions with members of the social graph (e.g., the frequency of interaction, the type of interaction, and so forth). For example, a user that frequently clicks on posts by a particular contact may be considered to be closer to that contact than to other contacts where they click on respective posts less frequently. Likewise, if a user frequently "mouses-over" content by an author (e.g., a search result link), but does not select that content, the degree of affinity may be less than if the link were selected. Similarly, an amount of time viewing content may be an indicator that one party likes content from another party. The amount of time viewing particular content may be an indication that one party likes that particular type of content from the other party, as opposed to other types of content from the other party.

In other examples, affinity may be defined by indirect interaction between users. For example, if two users interact with the same content regularly or frequently, those two users may be considered to have an affinity with one other. In still other examples, if two users interact with the same people regularly or frequently, those two users may be considered to have an affinity with one other.

Figure 4:
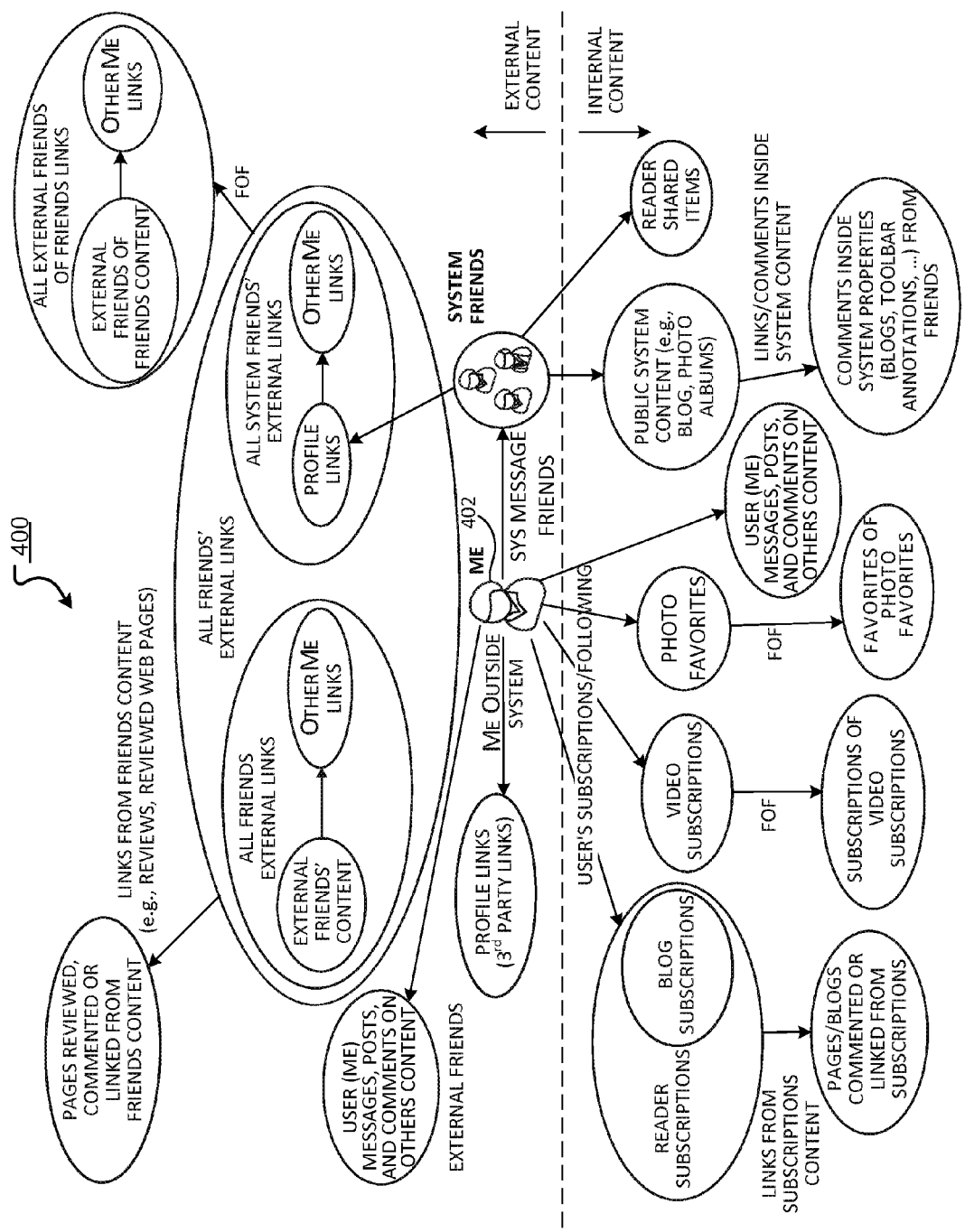
FIG. 4 is a conceptual view of an example of a social graph.

FIG. 4 is a conceptual view of an example social graph 400. Among other things, FIG. 4 shows sources of information for a social graph. In this example, the user's social graph is a collection of connections (e.g., users, resources/content, etc.) identified as having a relationship to the user 402 ("ME") within some degree of separation. The user's social graph may include parties and particular content at different degrees of separation. For example, the social graph of a user may include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

FIG. 4 shows that it is possible to extend the user's social graph to people and content both within a single network and across one or more external networks. For example, the user may have a profile or contacts list that includes a set of identified contacts, a set of interests, a set of links to external resources (e.g., Web pages), and subscriptions to content of a system (e.g., a system that provides various content and applications including electronic messages, chat, video, photo albums, feeds, or blogs). Likewise, blogs that include links to a user's contacts may be part of the user's social graph. These groups may be connected to other users or resources at another degree of separation from the user. For example, contacts of the user may have their own profiles that include connections to resources as well as contacts of the respective contacts, a set of interests, and so forth. In another example, a user may be connected to a social network account. That social network account may reference an article in a newspaper. A social connection, therefore, may be established between the user and the author of the article.

In some implementations, the connections to a user within a specified number of degrees of separation may be considered the bounds of the social graph of a user. Membership and degree of separation in the social graph may be based on other factors, including a frequency of interaction. For example, a frequency of interaction may be by the user (e.g., how often the user visits a particular social networking site) or it may be a type of interaction (e.g., endorsing, selecting, or not selecting items associated with contacts). As interactions change, the relationship of a particular contact in the social graph may also dynamically change. Thus, the social graph may be dynamic rather than static.

Social signals may be layered over the social graph (e.g., using weighted edges or other weights between connections in the social graph). These signals, for example, frequency of interaction or type of interaction between the user and a particular connection, may be used to weight particular connections in the social graph or social graphs without modifying the actual social graph connections. These weights may change as the interaction with the user changes.

Social graphs may be stored using suitable data structures (e.g., list or matrix type data structures). Information describing an aspect of a stored social graph may be considered relationship data. For example, relationship data may include information describing how particular members of a user's social graph are connected to a user (e.g., through what social path is a particular entity connected to the user). Relationship data may also include information describing social signals incorporated in the user's social graph. In some implementations, relationship data may be stored in a relationship lookup table (e.g., a hash table). Suitable keys for locating values (e.g., relationship data) within the lookup table may include information describing the identities of both a user and a member of the user's social graph. For example, a suitable key for locating relationship data within the lookup table may be (User X, User Y), where User Y is a member of User X's social graph.

Social graph information, including that described above, may be indexed for use in information retrieval. The social graph information may be part of a search index in the indexed cache 314 of FIG. 3. Accordingly, the search index may be searched to identify relevant search results that are dependent upon social signals, e.g., that are associated with one or more aspects of a user's social graph, examples of which are provided above. For example, a search system may receive a query and identify, e.g., general search results and user-generated content. The user-generated content may include, e.g., search results based on the indexed social graph information (e.g., content from electronic messages, posts, blogs, chats, etc. of members of the searcher's social graph). The indexed social graph information may be updated intermittently or periodically, for example, to include recently added information associated with the user's social graph. The indexed social graph information may also be updated, e.g., on an on-going basis to reflect relationships determined in accordance with the processes described herein.

A user may prevent addition of members to the user's social graph, e.g., using an available option or by keeping contacts out of particular groups used to generate the social graph. In some implementations, privacy features provide a user with an option(s) to allow or to prevent, respectively, being included (or removed the user if already included) as a member of another's social graph. Thus, users may have control over what personal information or connection information, if existing, is included in their social graphs and, consequently, that is included in the content streams and search results described herein.

Figure 5:
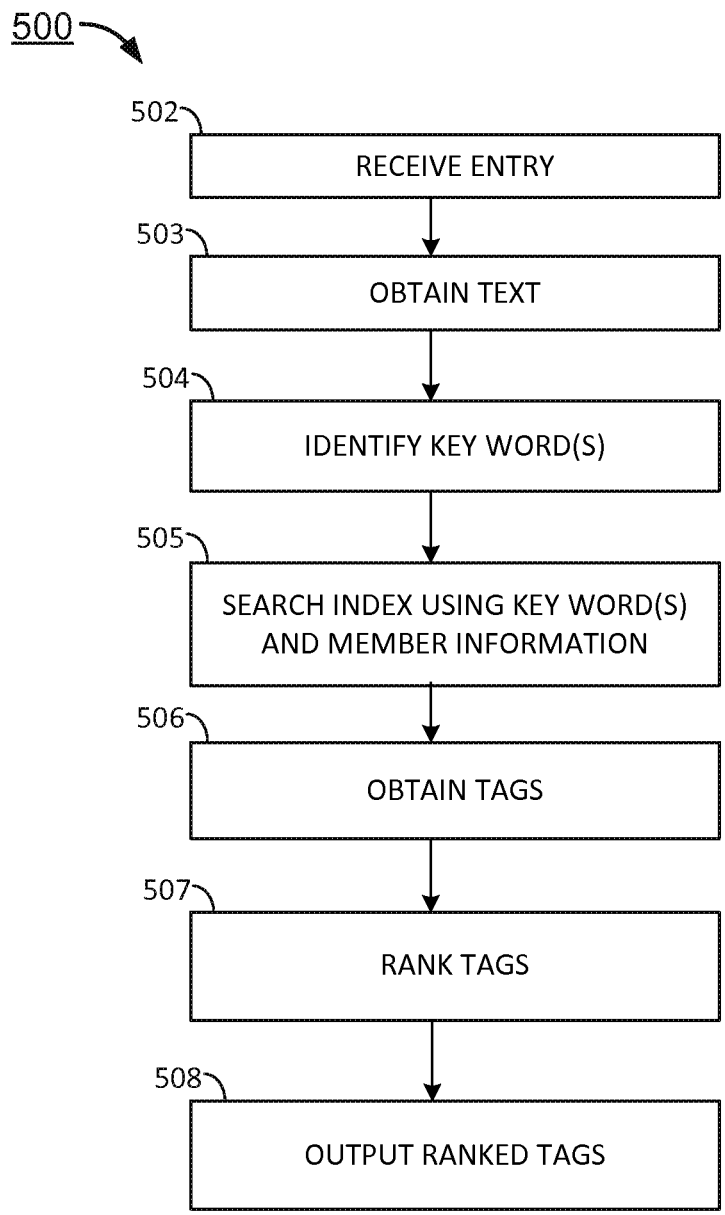
FIG. 5 is a flowchart showing an example of a process for suggesting a tag for content.

FIG. 5 is a flowchart of an example of a process for suggesting a tag to add to a post when no tag is being/has been entered. Process 500 may be performed by a dedicated tag engine 322 in combination with search engine 318.

Figure 6:
FIG. 6 is an example of a Web page containing input content.

Process 500 receives (502) an entry in a sharebox of a Web page (e.g., the Web page of FIG. 2), along with an indication that the entry is a post. In this regard, controls on the Web page may include a post function 230, which may be selected to add a post to a discussion topic through the sharebox. An example of such a post is 601 shown in FIG. 6, which reads: "The Boston Red Sox Are Having A Great Season This Year". The post does not contain a tag marker (e.g., a "#" sign or other indicia); accordingly, no tag marker is recognized by process 500. Process 500 therefore suggests tags to incorporate into the post.

Process 500 obtains (503) relevant text from the entry (e.g., post 601), and identifies (504) one or more key words in the entry that correspond to the subject of the text entry. For example, process 500 may disregard prepositions, and other words (e.g., stop words) in the text entry. Using, e.g., natural language analysis techniques, process 500 may identify what appear to be key words in the entry that reflect the subject of the entry. In this example, those key words are "Red Sox". Process 500 uses the identified key words ("Red Sox") to search (505) an index (e.g., indexed cache 314) for content that may be relevant to the text entry. This searching (505) may be performed as described below. In this regard, it is notable that process 500 may be used with input other than text entries. For example, the content entered into the sharebox may be an image, and the searching (505) may be performed using an attribute of the image, e.g., the image itself, metadata for the image, or other information associated with the image.

Process 500 may use "Red Sox" as a query term to search (505) indexed cache 314. In this example, process 500 searches indexed cache 314 for content relating to the Red Sox. Process 500 may search the index by topic and/or by tag. For example, indexed tags may be searched to identify tags containing the phrase "Red Sox" or a character sequence included in the phrase "Red Sox". Likewise, discussion forum posts or other content relating to the Red Sox, but whose tags do necessarily not include the phrase "Red Sox" or some variation thereof, may also be searched. The searching performed may therefore identify content with tags that contain the phrase "Red Sox" or some variation thereof, and content with tags that may not contain the phrase "Red Sox".

In some implementations, process 500 may search the index to identify content of conversations in a discussion forum, participants in those discussions, and other appropriate information to identify content related to the Red Sox. In some implementations, process 500 may search a user's social graph to identify social connections to participants in identified discussion forums, or participants having shared interests with the searcher. Such information may be used in identifying and ranking tags, as described below.

In this regard, the searching process may include assigning relevance scores to content (in the example above, to content that relates to the Red Sox). The relevance score for content in the index may correspond to a probability that the content relates to the topic of content entered by the member in the sharebox. The relevance score may be based on factors unrelated to the member, e.g., based on whether the content includes text or other information that matches the input content entry. The relevance scores may also be based on information associated with the member, examples of which are described herein.

The information associated with the member may include, e.g., social connections of the member to others on and/or off of the social network including relative strengths (affinity) of those connections, a geographic location of the member, a geographic proximity of the member to other members of the social network, a language of the member, content entries received from the member over a course of time, titles of discussion topics that the member has accessed over a course of time, titles of discussion topics that the member has entered over the course of time, subject matter of content that the user has accessed frequently over a course of time (e.g., 100 times in the past month), a profile of the member, and/or other appropriate social information (or combinations thereof) including, e.g., the social information described with respect to the social graph of FIG. 4.

In an example implementation, the foregoing information may be part of a search index, e.g., in indexed cache 314, and accessed as part of the searching process (505) using resource locator engine 316. In this regard, the identity of the member may be obtained, e.g., from the member's user identifier, screen name, or other elsewhere. The member's identity may be input to the search engine, which accesses the search index to obtain information associated with the member like that described above, which can be used in suggesting discussion tags. In some implementations, the system may provide features through which the member provides approval to have the foregoing information collected and indexed, or features through which the member prevents the foregoing information from being collected and indexed.

The information described above may be weighted in determining the relevance scores of indexed content to the input content entry. For example, the strength of the social connection between the member and an author of indexed content may affect the relevance score of that content to the input content entry. In an example, content to which a member has a closer social connection (e.g., the member has an affinity to the content author) may be deemed more relevant than content to which the user has a further, or no, social connection.

As noted above, the relevance score may also be affected by geographic location of the member entering the content (e.g., the "The Boston Red Sox Are Having A Great Season This Year" noted above). For example, if the member is from Boston, then the system may adjust relevance scores of content from members from Boston, content about Boston, and related content so that the scores indicate greater relevance than non-Boston content.

The relevance score may be affected by geographic proximity of the member to other members of the social network. In the example described above, adjusting relevance scores for content from members from Boston is an example of geographic proximity. However, in another example, two members may also check-in at an event or place using an appropriate feature of a social networking service. The system may identify other members who have checked-in to the same location as the member entering the content, and use that information to adjust relevance scores of discussion content associated with those members so that the relevance scores indicate greater relevance than content associated with other members of the social network.

The system may adjust relevance scores of content in the member's own language so that the scores indicate greater relevance than content not in the member's own language.

The language of a member may be obtained directly from a member's profile, from the member's posts, or from elsewhere.

The system may adjust relevance scores of content that relates to entries previously received from the member over a course of time so that the scores indicate greater relevance than other content. For example, if the member posts about the Boston Red Sox on a regular basis, then the system may adjust relevance scores of content about the Boston Red Sox to indicate greater relevance than content that is related, e.g., to the New York Yankees. The member's post content may be indexed and search to determine its subject matter.

The system may adjust relevance scores of content about a subject matter that the member has accessed over a course of time so that the scores indicate greater relevance than other content. Time may be a factor here. For example, accesses of content that are more recent (e.g., within the past month) may be weighted more heavily than accesses of content that are older (e.g., more than a year old).

After determining the relevance scores of the content, process 500 selects (506) a subset of the content with scores indicative of the greatest relevance. For example, five, ten, twenty, or another number of discussion topics may be selected. Tags are obtained (506) that correspond to the selected content. For example, those tags may be retrieved from the index. In some implementations, process 500 may screen discussion topics and eliminate, during search, those discussion topics that do not have associated tabs. In some examples, the tags that are obtained may begin with, or include, the phrase "RedSox". In other examples, the tags that are obtained will relate to the Red Sox, but need not include the phrase "RedSox". For example, the tag "BoSox" may be obtained. That tag relates to the Red Sox, but does not contain the phrase "RedSox".

Process 500 ranks (507) the obtained tags. In some examples, the ranking may include listing the tags by relevance score of the corresponding content or tag. In other examples, additional signals may be applied to generate ranking scores for the discussion tags. These additional signals may include, e.g., information that was, or was not, used to generate the original relevance scores. For example, in some implementations, the relevance scores may be determined based on social information, e.g., based on social connections of the member to others on and/or off of the social network, as described above. The ranking scores may then take into account additional signals, e.g., the popularity of the identified discussion titles across the social network and/or the times that the discussion titles were posted or accessed. Thus, in some example implementations, the relevance scores may be based primarily (although not necessarily exclusively) on social signals, while the ranking scores may be based primarily (although not necessarily exclusively) on non-social signals. In other example implementations, the converse may be the case.

In some examples, one or more of the following may, or may not, be used in generating the ranking scores: social connections of the member to others on and/or off of the social network including relative strengths (affinity) of those connections, a geographic location of the member, a geographic proximity of the member to other members of the social network, a language of the member, content entries received from the member over a course of time, titles of discussion topics that the member has accessed over a course of time, titles of discussion topics that the member has input over the course of time, and/or subject matter of content that the user has accessed frequently over a course of time a profile of the member.

Figure 7:
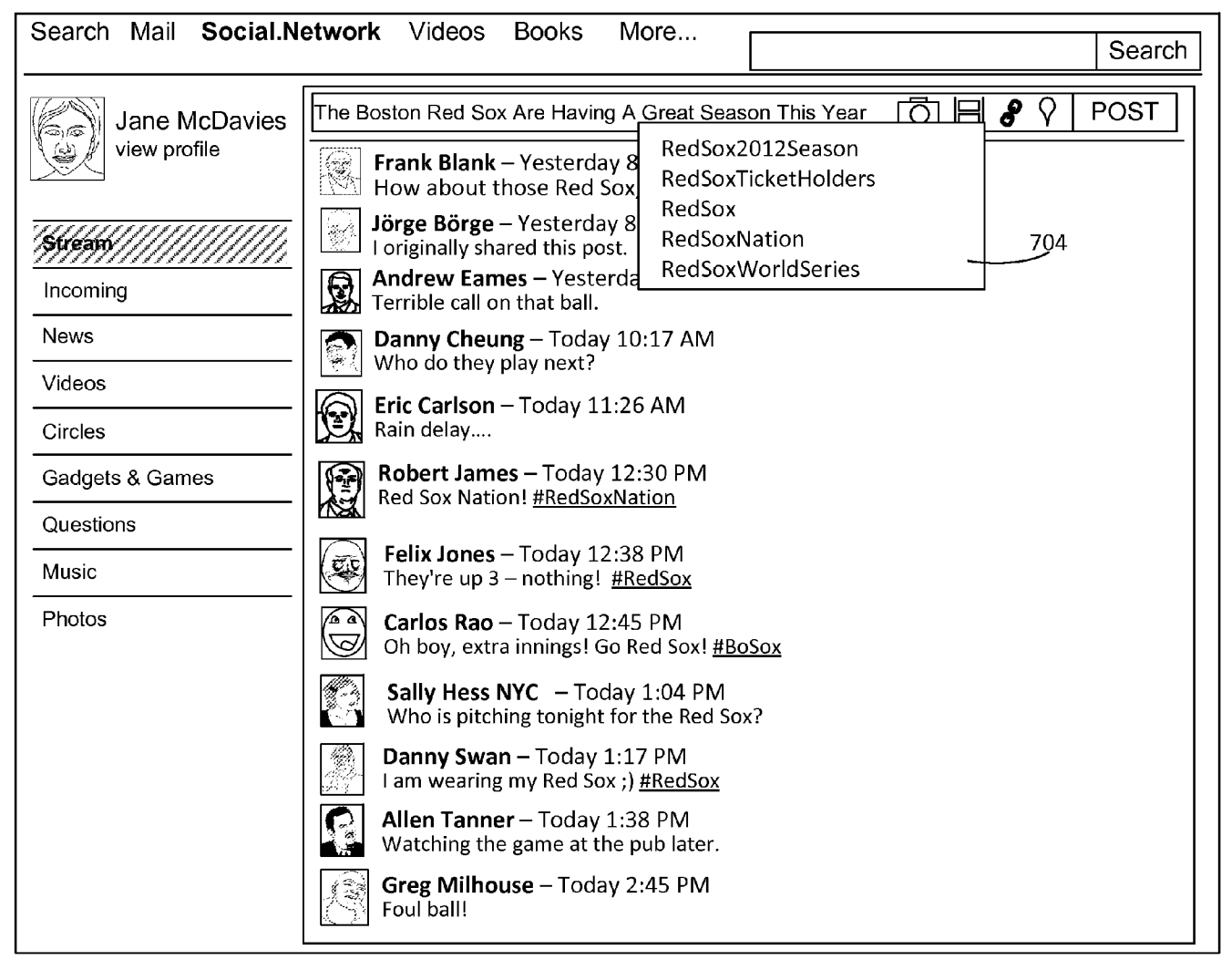

Process 500 outputs (508) ranked suggestions. As shown in FIG. 7, the suggestions 704 correspond to the content in the sharebox (e.g., "The Boston Red Sox Are Having A Great Season This Year"), but is also affected by, e.g., social connections of the member posting the content. For example, the system may know that the member has season tickets for 2012 (e.g., based on posts that the member has made) and, therefore, presents, as a suggestion "RedSox2012Season" prior to "RedSox". The suggestions may be provided in an appropriate location relative to the sharebox. For example, the suggestions may be provided adjacent to the sharebox (e.g., underneath the sharebox) or in a pop-up window. The user may select a suggestion, e.g., by touching or pointing and clicking. The selected tag may populate the sharebox. As a result, a text input associated with that tag will be linked to the discussion topic associated with the tag.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network).

Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

Content generated according to the processes described herein may be displayed on a computer peripheral (e.g., a monitor) associated with a computer, a mobile device display, and so forth. The display physically transforms the computer peripheral. For example, if the computer peripheral is an LCD display, the orientations of liquid crystals are changed by the application of biasing voltages in a physical transformation that is visually apparent to the user. As another example, if the computer peripheral is a cathode ray tube (CRT), the state of a fluorescent screen is changed by the impact of electrons in a physical transformation that is also visually apparent. Moreover, the display of content on a computer peripheral is tied to a particular machine, namely, the computer peripheral.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

All processes described herein and variations thereof (referred to as "the processes") contain functionality to ensure that party privacy is protected. To this end, the processes may be programmed to confirm that a user's membership in a social networking account is publicly known before recommending a connection to that user through the social networking account. Likewise, the processes may be programmed to confirm that information about a party is publicly known before divulging that information to other party, or even before incorporating that information into a social graph.

In the context of this disclosure, the terms social network and social networking service may be used interchangeably.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

Features described herein may be used in combination with features described in U.S. Provisional Application No. 61/586,390, which was incorporated herein by reference. Features described herein and features described in U.S. Provisional Application No. 61/586,390 may be used separately.

Other implementations not specifically described herein are also within the scope of the following claims.

What is claimed is:

1. A method performed by one or more processing devices comprising:

receiving, from a member of a social network, an entry in a display field along with an indication that the entry is for a post;

after receiving the entry and the indication, identifying content by performing a search using a search query comprising at least one keyword included in the entry and information about the member of the social network, the information comprising social connections of the member;

determining relevance scores for the content identified, a relevance score comprising a measure of how closely content matches the search query;

obtaining tags corresponding to identified content having relevance scores that indicate greater relevance to the search query than other content;

ranking the tags to produce ranked tags based at least on some of the information about the member of the social network;

outputting the ranked tags as suggestions to include with the display field upon selection; and augmenting the entry by associating, with the entry, a tag selected for display in the display field.

2. The method of claim 1, wherein the selected tag categorizes the entry by associating the entry with a discussion topic corresponding to the selected tag.

3. The method of claim 1, wherein the member has social connections to others on and/or off of the social network.

4. The method of claim 1, wherein the information comprises a geographic location of the member.

5. The method of claim 1, wherein the information comprises a geographic proximity of the member to other members of the social network.

6. The method of claim 1, wherein the information comprises a language of the member.

7. The method of claim 1, wherein the information comprises content entries received from the member over a course of time.

8. The method of claim 1, wherein the information comprises tags of discussion topics that the member has selected over a course of time.

9. The method of claim 1, wherein the information comprises subject matter of content that the member has accessed over a course of time.

10. The method of claim 1, wherein the information comprises a profile of the member.

11. The method of claim 1, wherein identifying the content comprises determining, for at least some of the content, a probability that the at least one keyword included in the entry corresponds to the content.

12. The method of claim 11, wherein the tags are ranked in accordance with respective probabilities of corresponding content and also based on the information associated with the member; and wherein selected tags are output in order of rank.

13. The method of claim 1, wherein the tags are obtained based also on a frequency of appearance of the tags on the social network.

14. The method of claim 1, wherein the tags are obtained based also on times corresponding to when the tags were created on the social network.

15. One or more non-transitory machine-readable media storing instructions that are executable by one or more processing devices to perform operations comprising:

receiving, from a member of a social network, an entry in a display field along with an indication that the entry is for a post;

after receiving the entry and the indication, identifying content by performing a search using a search query comprising at least one keyword included in the entry and information about the member of the social network, the information comprising social connections of the member;

determining relevance scores for the content identified, a relevance score comprising a measure of how closely content matches the search query;

obtaining tags corresponding to identified content having relevance scores that indicate greater relevance to the search query than other content;

ranking the tags to produce ranked tags based at least on some of the information about the member of the social network;

outputting the ranked tags as suggestions to include with the display field upon selection; and augmenting the entry by associating, with the entry, a tag selected for display in the display field.

16. A computer system comprising:

one or more processing devices; and one or more machine-readable hardware storage devices storing instructions that are executable by the one or more processing devices to perform operations comprising:

receiving, from a member of a social network, an entry in a display field along with an indication that the entry is for a post;

after receiving the entry and the indication, identifying content by performing a search using a search query comprising at least one keyword included in the entry and information about the member of the social network, the information comprising social connections of the member;

determining relevance scores for the content identified, a relevance score comprising a measure of how closely content matches the search query;

obtaining tags corresponding to identified content having relevance scores that indicate greater relevance to the search query than other content;

ranking the tags to produce ranked tags based at least on some of the information about the member of the social network;

outputting the ranked tags as suggestions to include with the display field upon selection; and augmenting the entry by associating, with the entry, a tag selected for display in the display field.

* * * * *